US009225962B2

(12) United States Patent
Au et al.

(10) Patent No.: US 9,225,962 B2
(45) Date of Patent: Dec. 29, 2015

(54) STEREO MATCHING FOR 3D ENCODING AND QUALITY ASSESSMENT (75) Inventors: James Au, Richmond (CA); Jaehin In, Coquitlam (CA); Arturo A. Rodriguez, Norcross, GA (US); Ali Jerbi, North Vancouver (CA); Jiawei Huang, Burnaby (CA)

(73) Assignee: Cisco Technology, Inc., San Jose, CA (US)

( * ) Notice: Subject to any disclaimer, the term of this patent is extended or adjusted under 35 U.S.C. 154(b) by 514 days.

(21) Appl. No.: 13/549,945

(22) Filed: Jul. 16, 2012

(65) Prior Publication Data

US 2014/0015923 A1    Jan. 16, 2014

(51) Int. Cl.
*H04N 13/00* (2006.01)
*H04N 19/00* (2014.01)
*G06T 7/00* (2006.01)

(52) U.S. Cl.
CPC .......... *H04N 13/0048* (2013.01); *G06T 7/0002* (2013.01); *G06T 7/0075* (2013.01); *G06T 2207/10021* (2013.01); *G06T 2207/30168* (2013.01); *H04N 2013/0081* (2013.01)

(58) Field of Classification Search
CPC .......... H04N 13/0055; H04N 13/0059; H04N 13/0048; H04N 13/0239; H04N 19/00769; G06T 7/0002; G06T 7/0075
See application file for complete search history.

(56) References Cited

U.S. PATENT DOCUMENTS

| | | | |
|---|---|---|---|
| 2010/0231689 A1* | 9/2010 | Bruls et al. | 348/43 |
| 2011/0080464 A1* | 4/2011 | Alessandrini et al. | 348/42 |
| 2012/0002723 A1* | 1/2012 | Arakawa et al. | 375/240.03 |
| 2014/0037206 A1* | 2/2014 | Newton et al. | 382/166 |

* cited by examiner

*Primary Examiner* — Jefferey Harold
*Assistant Examiner* — Sean Haiem
(74) *Attorney, Agent, or Firm* — Merchant & Gould (57) ABSTRACT

Systems and methods may be provided embodying a novel approach to measuring degradation (or distortion) by analyzing disparity maps from original 3D video and reconstructed 3D video. The disparity maps may be derived using a stereo-matching algorithm exploiting 2-view stereo image disparity. An overall distortion measure may also be determined resulting from the weighted sum of plural measures of distortions, one of the plural distortion measures corresponding to a measure of disparity degradation, and another one corresponding to a measure of geometrical distortion. The measure (or overall distortion measure) is used during real-time encoding to effect various decisions, including mode decision in the coding of each corresponding stereo pair, and in rate control (including stereo pair quantization).

13 Claims, 10 Drawing Sheets

STEREO MATCHING FOR 3D ENCODING AND QUALITY ASSESSMENT

BACKGROUND

Traditional objective methods of evaluating digital video quality and video encoding performance, such as PSNR (Peak Signal-to-Noise Ratio) and SSIM (Structural Similarity) are commonly employed as a tool to quantify degradation. Although these methods do not necessarily track human perception, they have been deemed suitable to track video coding performance during real-time video coding and coding algorithm development since they quantify the errors (i.e., differences) between the produced distorted pictures and their corresponding reference pictures. However, the structural information inherent in stereo image pairs is a crucial factor in assessing stereo 3D video quality and coding performance. As such, there exists a need to improve existing metrics for stereo 3D video coding.

BRIEF DESCRIPTION OF THE DRAWINGS

The accompanying drawings, which are incorporated in and constitute a part of this disclosure, illustrate various embodiments. In the drawings.

DESCRIPTION OF EXAMPLE EMBODIMENTS

Overview

Consistent with embodiments of the present disclosure, systems and methods are disclosed for providing a quantification of the intrinsic structural correlation between corresponding stereo image pairs. Stereo matching techniques may be employed to estimate disparity as a tool to track 3D video coding performance and as one of a plurality of ingredients to quantify 3D video quality.

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A 3D television (3D-TV) is a television set that employs techniques of 3D presentation, such as stereoscopic capture, multi-view capture, or 2D plus depth, and a 3D display—a special viewing device to project a television program into a realistic three-dimensional field. In a 3D-TV signal such as that described in the 3D portion of the High Definition Multimedia Interface HDMI 1.4a specification, which is hereby incorporated by reference in its entirety, three-dimensional images may be displayed to viewing users using stereoscopic images. That is, two slightly different images may be presented to a viewer to create an illusion of depth in an otherwise two-dimensional image. These images may be presented as right-eye and left-eye images that may be viewed through lenses such as anaglyphic (with passive red-cyan lenses), polarizing (with passive polarized lenses), and/or alternate-frame sequencing (with active shutter lenses).

As used throughout the present disclosure, stereo 3D video refers to stereo 3D picture sequences. Within the 3D picture sequences there is a Left picture sequence and a Right picture sequence, wherein each picture of the successive pictures in a Left picture sequence, Pic_Left(n), corresponds to a respective picture of the successive pictures in a Right picture sequence, Pic_Right(n), where n is an integer representing the n-th successive picture in each of the two respective picture sequences. Each corresponding pair of pictures, Pic_Left(n) and Pic_Right(n), also referred to as a corresponding stereo picture pair, are representations of the same visual information but at different viewing angles and intended to be output simultaneously or contemporarily to induce a 3D perception effect.

In one embodiment, the successive corresponding Left and Right stereo picture pairs, or processed picture versions thereof, are output simultaneously on a display device capable of presenting them simultaneously. In an alternate embodiment, the corresponding Left and Right pictures of the successive corresponding stereo picture pairs, or processed picture versions thereof, are output as a Left picture followed by the respectively corresponding Right picture, followed by the successive Left picture followed by the respectively corresponding successive Right picture, and so on.

Figure 1:
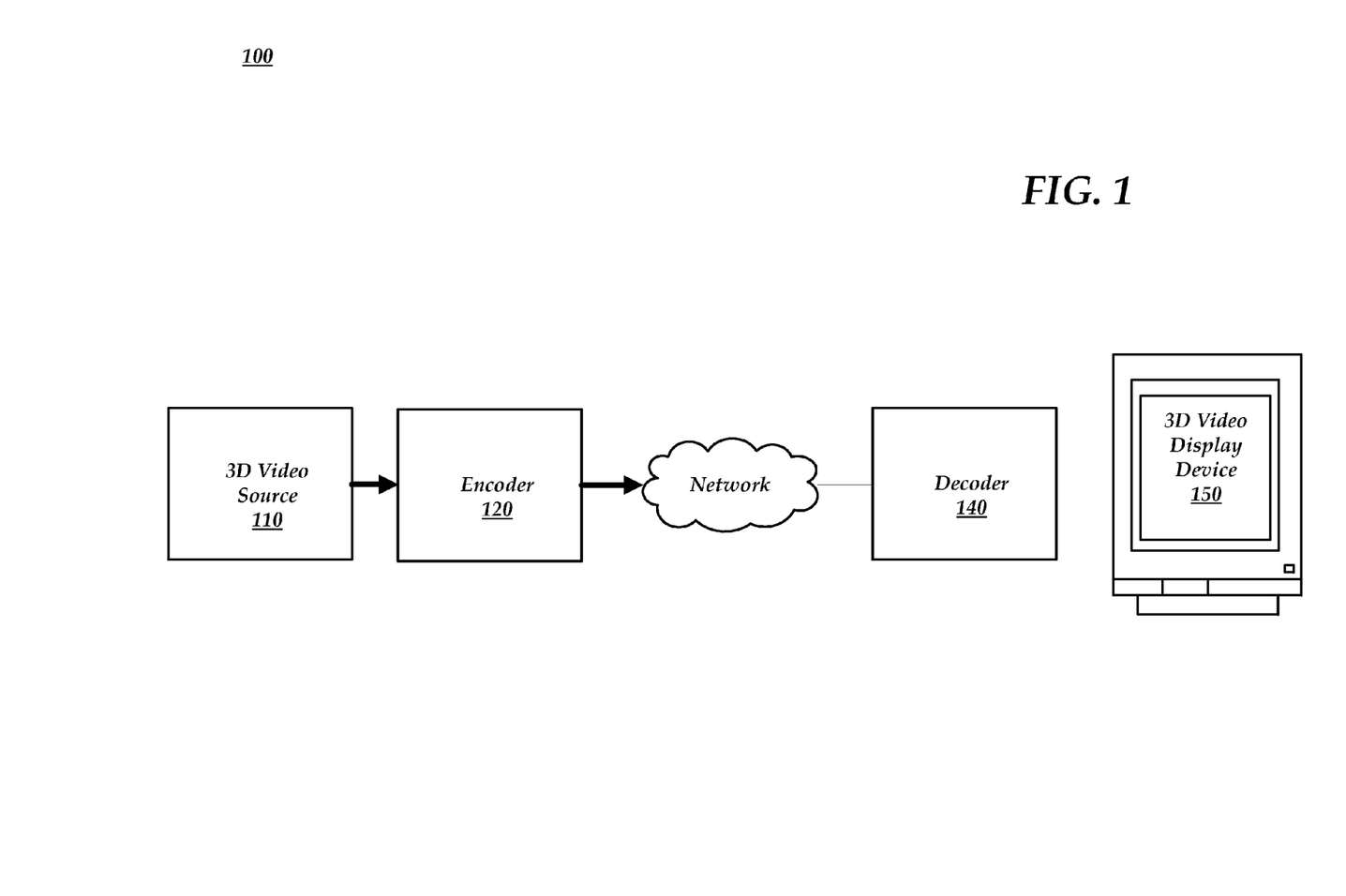
FIG. 1 is a block diagram of an operating environment.

FIG. 1 is a block diagram illustrating an operating environment for providing stereo matching for 3D encoding and quality assessment. Note that the video system 100 shown in FIG. 1 is merely illustrative and should not be construed as implying any limitations upon the scope of the preferred embodiments. In this example, the video system 100 includes a 3D video source 110. For example, 3D video source 110 may be a 3D video camera coupled to an encoder 120. Encoder 120 may include one or more server devices (not shown) for providing video, audio, and textual data to client devices such as decoder 140.

Encoder 120 may provide the encoded 3D video signal to a decoder 140 via a network 130. The network 130 may comprise any suitable mechanisms and/or media for communicating 3D video data including, for example, the Internet, a cable television network or a satellite television network, among others.

Encoder 120 accepts as input, a source 3D video stream. Source 3D video stream may come from a plurality of sources, such as 3D video source 110. Encoder 120 may receive source 3D video stream and through the utilization of any number of compression algorithms translate the source 3D video stream into a transmission 3D video stream.

Decoder 140 may receive the transmission 3D video stream and further restructure the transmission 3D video stream into a display 3D video stream. The display 3D video stream then streamed to a 3D video display device 150 via a communications channel. The communications channel may take on a variety of forms such as, wireless or cable or any other form of transmitting data.

3D video display device 150 may be situated at a user's residence or place of business and may be a stand-alone unit or integrated into another device such as, for example, a television set. 3D video display device 150 may receive signals corresponding to 3D video programs, each possibly carrying video, audio and/or other data.

Figure 2:
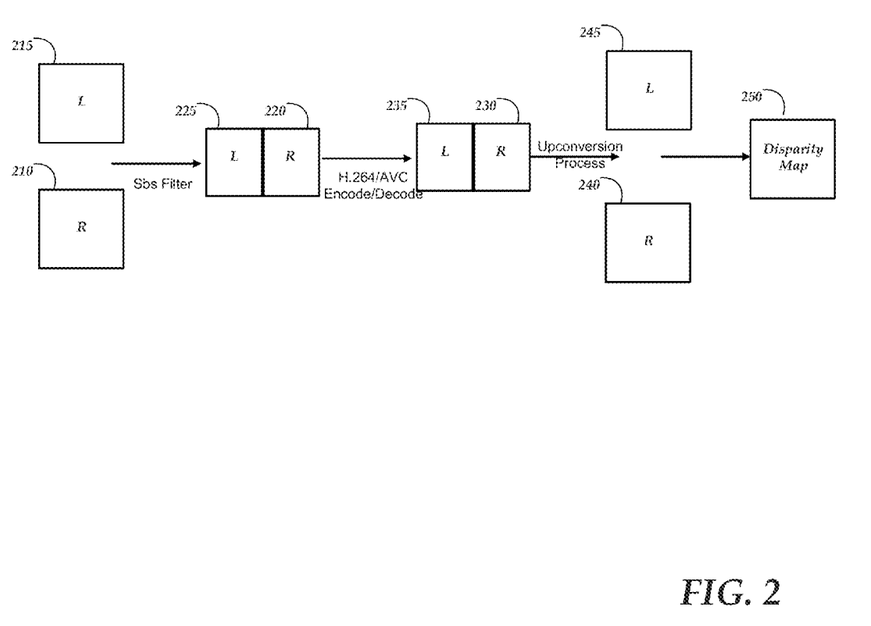
FIG. 2 illustrates embodiments described in the present disclosure.

FIG. 2 illustrates embodiments described in the present disclosure. For example, a 3D video stream may comprise of a left-eye image 215 situated next to a right-eye image 210. (It should be noted that "image" and "picture" may be construed similarly throughout this application). Left-eye image 215 and right-eye image 210 may be directed to a viewing user's correct eye through the use of coordinated lenses as described above to create the appearance of a three-dimensional effect upon eventual display.

Left-eye image 215 and right-eye image 210 may then go through a filtering procedure after capture. For example, the video sequence may be filtered such that they are side-by-side. After the filtering procedure completes, the process contains a side-by-side left-eye image 225 and right-eye image 220.

Next, side-by-side left-eye image 225 and right-eye image 220 may be compressed by an encoder, such as a H.264/AVC encoder with a pre-defined set of quantization parameter ("qp") values (such as, 24, 28, 32, 36, 40, and 44). Each compressed video may subsequently be decompressed into left-eye image 235 and right-eye image 230.

The decompressed left-eye image 235 and right-eye image 230 may then be upconverted to attempt to reproduce the source video. The resultant video now includes upconverted left-eye image 245 and right-eye image 240 sequences. Upconverted left-eye image 245 and right-eye image 240 may then go through disparity estimation as discussed in further detail below. The disparity estimation may include estimation by graph cuts and belief propagation stereo matching algorithms. Disparity map 250 may be produced as a quantifier of the disparity information.

Embodiments described herein find a unique mapping between points belonging to two images of the same scene (e.g., a left-eye image and a right-eye image). As these two views may be rectified during 3D video processing, points in one image may correspond to points along the same scanline in the other image. Similar to human binocular vision, by comparing the two images, relative disparity information may be obtained. In some embodiments, the disparity information may be obtained in the form of a disparity map.

Figure 3:
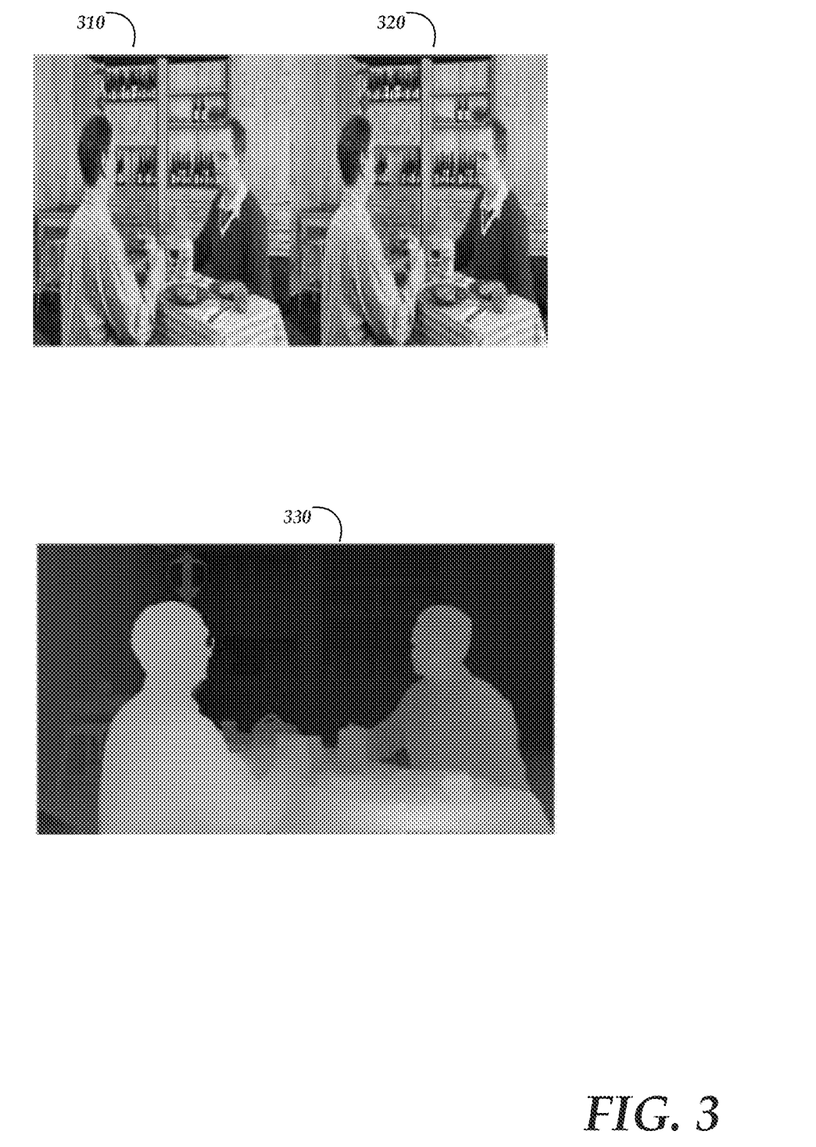
FIG. 3 illustrates a sample side-by-side image pair.

Turning to FIG. 3, a sample side-by-side image pair is illustrated. The side-by-side image pair may be comprised of a left-eye image 310 and a right-eye image 320. Depth map 330 may be a depth map (closer is brighter) from the range sensor. Depth map 330 may serve as a ground truth for subsequent disparity estimations.

One stereo matching algorithm for use with embodiments of this disclosure involves visual correspondence based on graph cuts. It has been shown that this approach may provide better results, with up to 4 times fewer errors than standard methods such as normalized correlation.

For example, let L be the set of pixels in the left image, R be the pixels in the right image, and P be the set of all pixels P=L∪R. The pixel p will have corrdinates ($p_x$, $p_y$). In the classical approach to stereo, the goal is to compute for each pixel in the left image, a label $f_p$ which denotes a disparity for a pixel p. The energy minimized in formula [1] below may be referred to as the Potts energy $$E(f) = \sum_{p \in L} D_p(f_p) + \sum_{p,q \in N} V_{p,q} T(f_p \neq f_q) \qquad [1]$$

where $D_p(f_p)$ is a penalty for the pixel p to have the disparity $f_p$, N is a neighborhood system for the pixels of the left image and T(*) is 1 if its argument is true and 0 otherwise.

Consider a particular disparity (or label) a. A configuration f' is said to be within a single α-expansion move of f if for all pixels p∈L either $f'_p = f_p$ or $f'_p = \alpha$. A configuration f' is said to within a single αβ-swap move of f if for all pixels p∈L, $f_p \notin \{\alpha, \beta\}$. These local improvement operations may rely on cuts. The expansion algorithm consists entirely of a sequence of αβ-swap local improvement operations for pairs of disparities α, β until no αβ-swap can reduce the energy.

Figure 4:
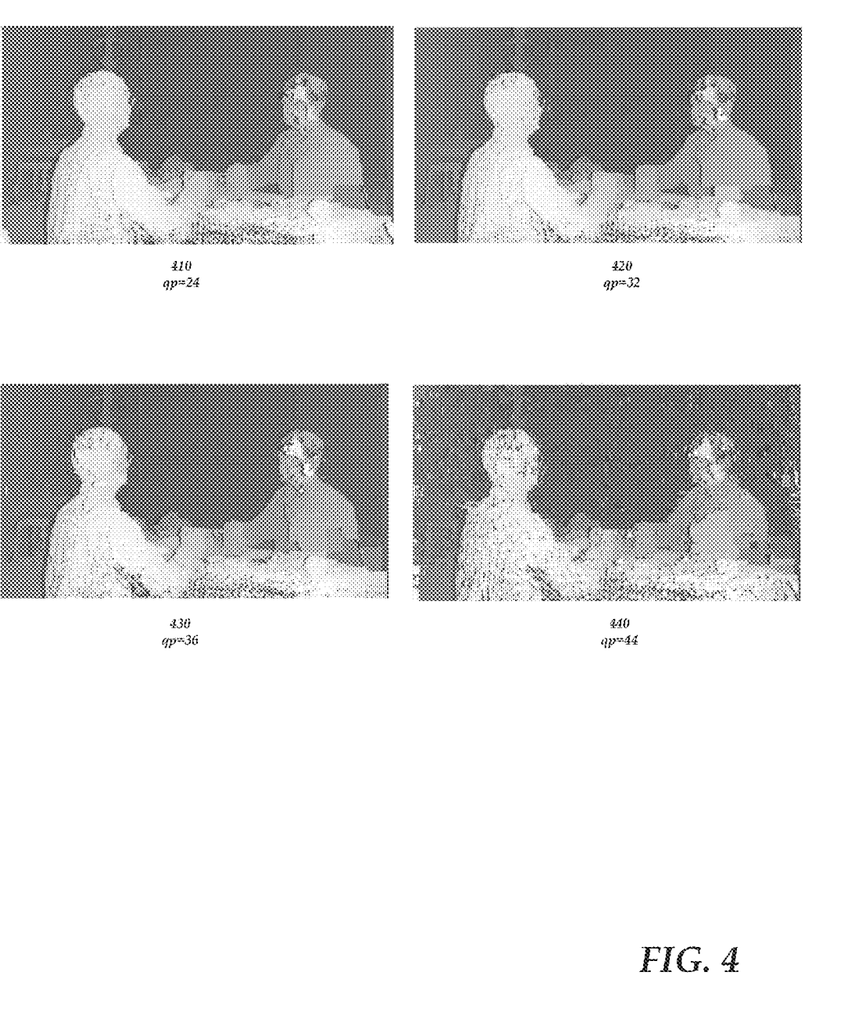
FIG. 4 illustrates generated disparity maps using graph cuts for the images depicted in FIG. 3.

FIG. 4 illustrates generated disparity maps using graph cuts for the images depicted in FIG. 3 and with encoder quantization parameter (QP) set to 24, 32, 36, and 44. Higher QP values results in higher compression but higher loss of input signals. Disparity map 410 corresponds to a qp=24. Disparity map 420 corresponds to a qp=32. Disparity map 430 corresponds to a qp=36. Disparity map 440 corresponds to a qp=44. Computer-generated disparity maps may contain noise which can cause errors due to false disparity estimations and (partial) occlusion. For example, note the inconsistent disparity estimation around human heads, the textured shirt, and tablecloth. Despite the artifacts made by the estimator, the quality of the disparity estimation may degenerate as the qp value increases.

Another stereo matching algorithm for use with embodiments of this disclosure involves belief propagation. Belief propagation is a global energy optimization method to perform stereo matching. Belief propagation works by passing messages around the graph defined by the four-connected image grid. In particular, a constant-space belief propagation algorithm may be executed in near real time (16 fps).

The constant-space belief propagation algorithm works based on a previously developed max-product belief propagation algorithm. The max-product belief propagation algorithm works by passing messages around the graph defined by the four-connected image grid. Each message is a vector of dimension given by the number of possible levels. At each iteration, the new messages are computed as shown in formula [2]

$$M_{x,y}^t(d) = \arg\min_{d_x}\left(E_{D,x}(d_x) + \sum_{s \in N(x), x \neq y} M_{s,x}^{t-1}(d_x) + h(d_x, d)\right) \quad [2]$$

where $M_{x,y}^t$ is the message vector passed from pixel x to one of its neighbors y, $E_{D,x}$ is the data term of pixel x, and $h(d_x, d)$ is the jump cost, d is the label that minimizes the total energy for pixel x, containing the data term and the smoothness term $$E_x(d) = E_{D,x}(d) + E_{S,x}(d) = E_{D,x}(d) + \sum_{y \in N(x)} M_{y,x}(d) \quad [3]$$

The common cost functions for the jump cost $h(d_x, d)$ are based on the degree of difference between labels. In order to allow for discontinuities, the truncated linear model is commonly adopted as formula [4].

$$h(d_x, d) = \rho\min(|d_x - d|, \eta)$$

where $\rho$ is a scalar constant and $\eta$ is a constant controlling when the cost stops increasing.

Figure 5:
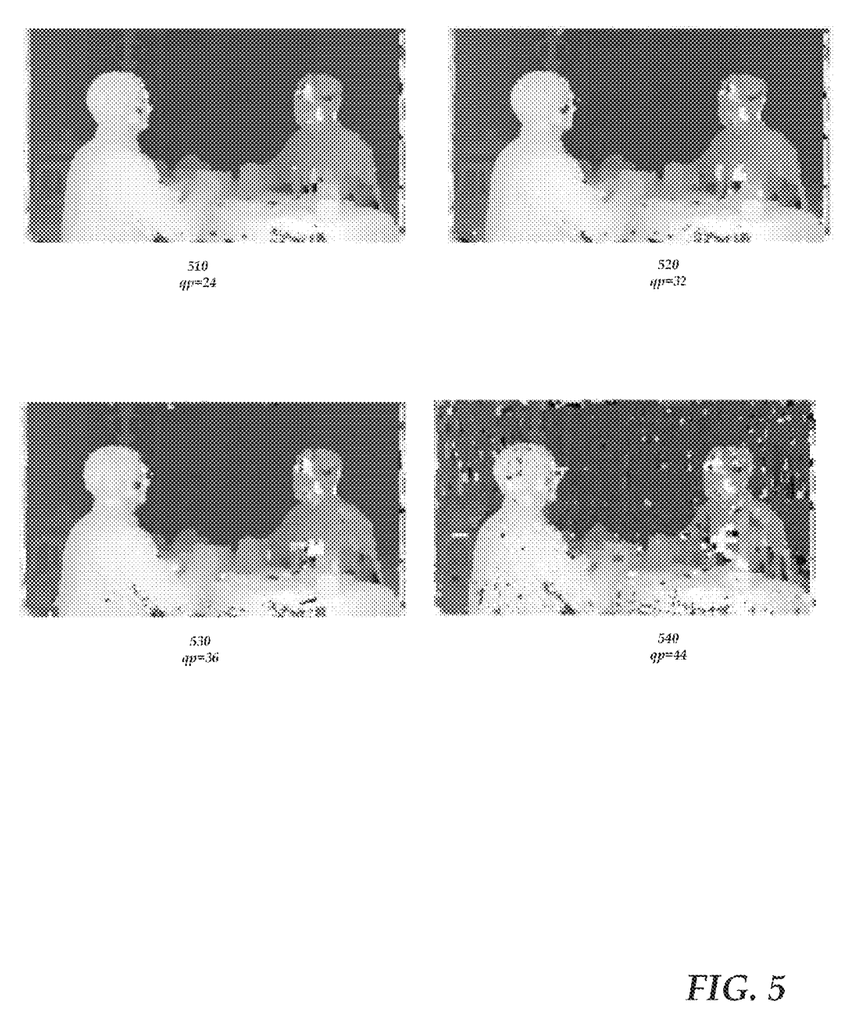
FIG. 5 illustrates generated disparity maps using present embodiments of belief propagation for the images depicted in FIG. 3.

FIG. 5 illustrates generated disparity maps using present embodiments of belief propagation for the images depicted in FIG. 3 and with encoder quantization parameter (QP) set to 24, 32, 36, and 44. Disparity map 510 corresponds to a qp=24. Disparity map 520 corresponds to a qp=32. Disparity map 530 corresponds to a qp=36. Disparity map 540 corresponds to a qp=44.

It can be seen that the belief propagation algorithm outperforms the graph cuts algorithm in a plurality of ways. First, belief propagation gives a cleaner disparity map than the graph cuts algorithm, especially around the human heads, the textured shirt, and the tablecloth. Next, the belief propagation algorithm runs in constant space O(1). Furthermore, the run time may be independent of the disparity level. Also, the belief propagation algorithm may be implemented in parallel and by using a graphics processing unit implementation, which may estimate the disparity in real time.

Figure 6:
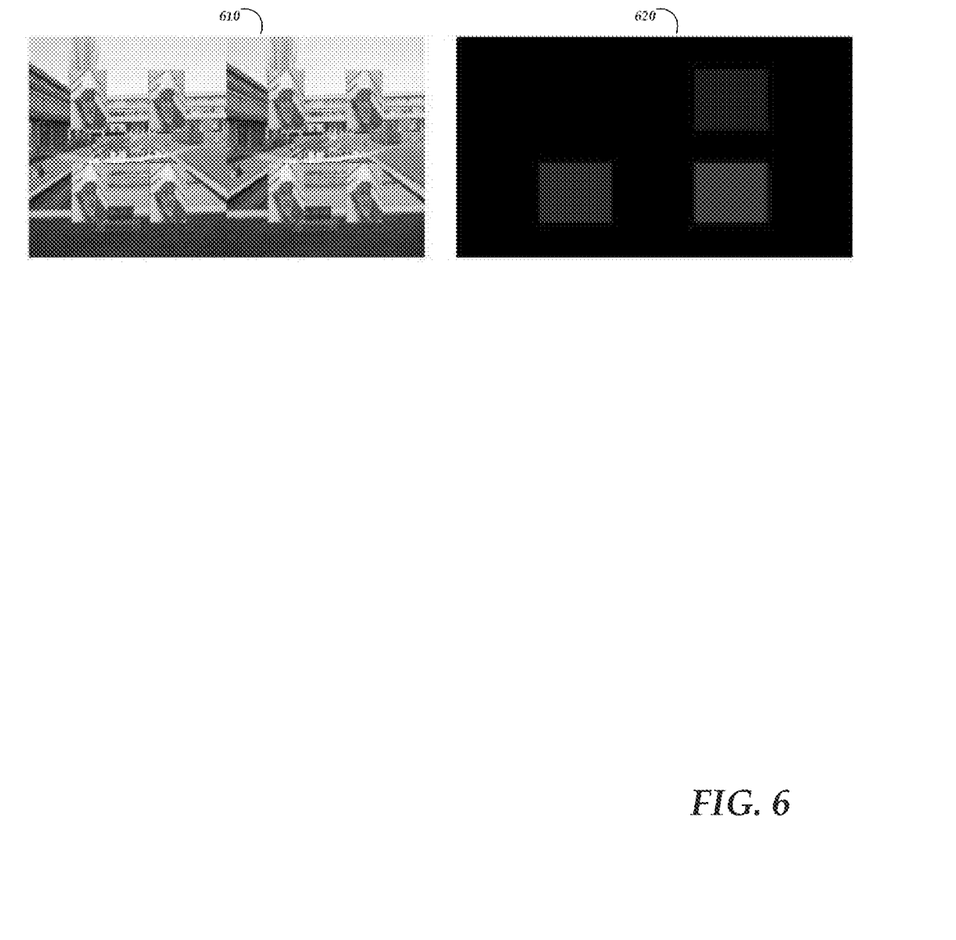
FIG. 6 illustrates results of experimentation of embodiments of the devised constant-space belief propagation algorithm.

FIG. 6 illustrates results of experimentation of embodiments of the devised constant-space belief propagation algorithm. A 3D video sequence designed to be a flat background (at zero parallax, the screen plane) with four identical "foreman" video sequences at increasing depth starting from the screen plane. Sample side-by-side image pair 610 is an example image pair depicting the various "foreman" depictions. Disparity map 620 shows a sample corresponding disparity map for image pair 610.

Figure 7:
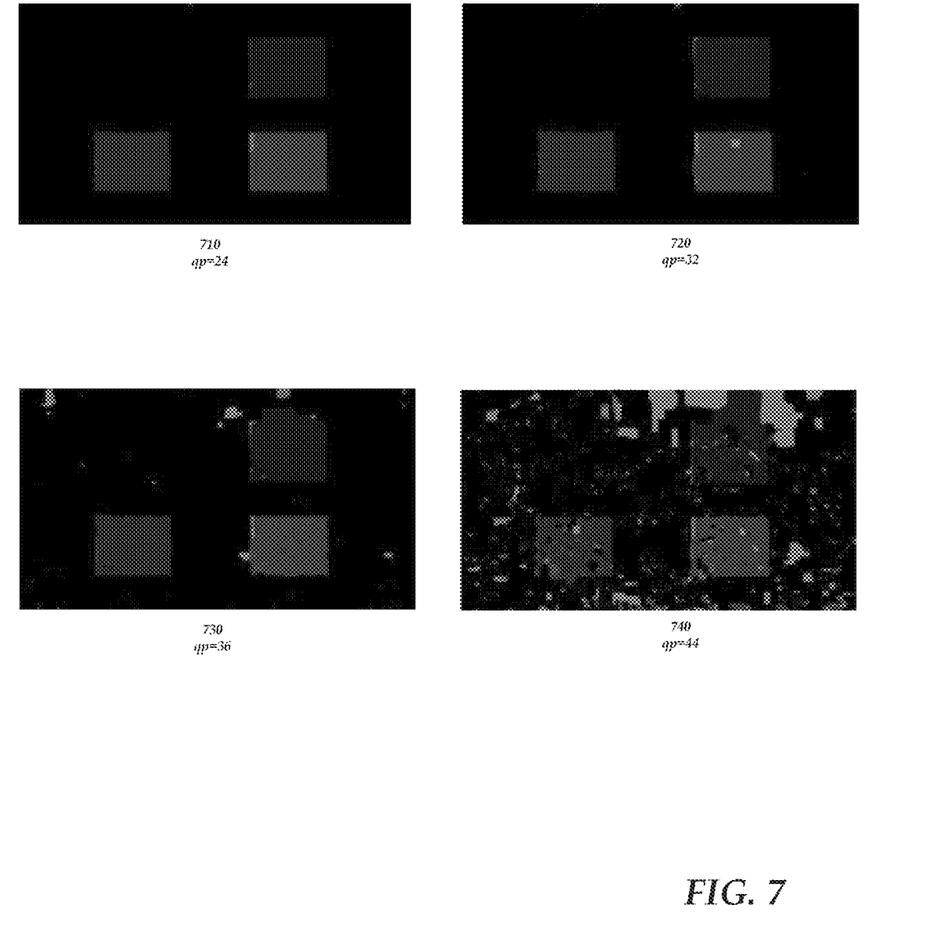
FIG. 7 illustrates generated disparity maps using present embodiments of belief propagation for the images depicted in FIG. 6.

FIG. 7 illustrates generated disparity maps using present embodiments of belief propagation for the images depicted in FIG. 6 and with encoder quantization parameter (QP) set to 24, 32, 36, and 44. Disparity map 710 corresponds to a qp=24. Disparity map 720 corresponds to a qp=32. Disparity map 730 corresponds to a qp=36. Disparity map 740 corresponds to a qp=44.

Figure 8:
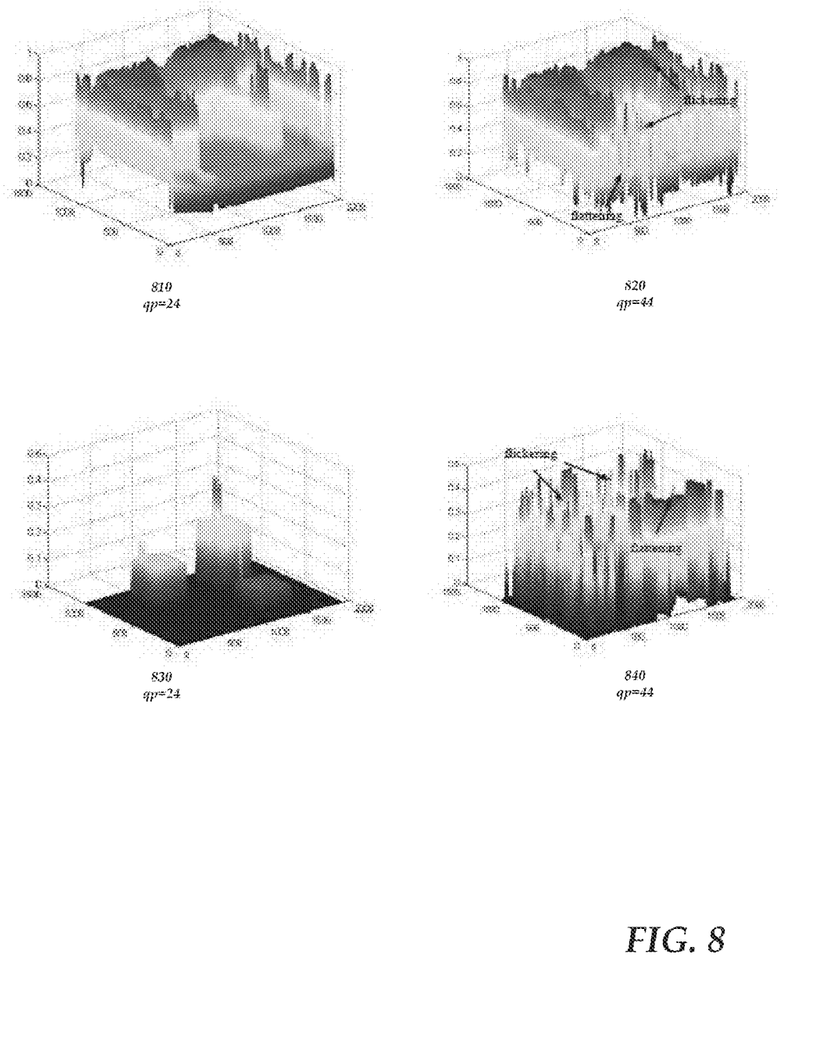
FIG. 8 illustrates computer generated disparity maps in 3D at qp=24 and qp=44.

FIG. 8 illustrates computer generated disparity maps in 3D at qp=24 and qp=44. 3D disparity map 810 corresponds to a qp=24 for the image pair described in FIG. 3. 3D disparity map 820 corresponds to a qp=44 for the image pair described in FIG. 3. 3D disparity map 830 corresponds to a qp=24 for the image pair described in FIG. 6. 3D disparity map 840 corresponds to a qp=44 for the image pair described in FIG. 6. In some embodiments, the disparity maps are first smoothed out by, for example, a 21×21 pixel Gaussian kernel with $\mu=0$ and $\sigma=7$. This may be done to reduce the amount of noise in the computer generated disparity maps.

It may be seen in FIG. 8 that the computer generated disparity map may become noisier and have more false matching when the qp value is increased. Visually the 3D experience was confirmed by subjective testing to suffer similar to and in the same areas of the disparity estimation errors after higher QP compression signal loss. This provides a clue as to the 3D video quality assessment by estimating the quality of the disparity maps. In some embodiments, the depth map (ground truth) may be combined with the disparity map. The depth map may be provided by hardware, e.g., a range sensor and provide a control/feedback system.

Looking at 3D disparity maps 820 and 840 reveals that the distortions and/or artifacts induced by the video compression process may result in incorrect disparity estimations. The image-wide errors may create certain 3D specific artifacts when viewing. Artifacts may include flickering artifacts which may cause a depth discontinuity (a sudden change) in temporal domain. Artifacts may further include flattening artifacts which may cause depth loss in the spatial domain. Other 3D artifacts may include pulsing, blockiness, and blurriness.

Embodiments of the present disclosure measure 3D artifacts by comparing the disparity map of the original (or sourced) stereoscopic 3D video, which is composed of an image pair (left image and light image) against the disparity map of the corresponding re-constructed 3D video. It should be notes that degradation or distortion in a a stereo 3D video signal can be manifested by undergoing any of plural signal processing operations, such as any form of lossy compression, pre- or post-filtering, noise reduction, etc.

Presently described embodiments work on stereoscopic 3D video signals. In particular, the methods of measuring distortion, born from disparity or geometrical structure errors, for evaluation of 3D video quality during encoding (or any other purpose) are applicable in coding Frame Compatible (FC) 3D video or as used in multiple-view coding of stereo 3D video (such as used in Blue Ray Disc video).

Figure 9:
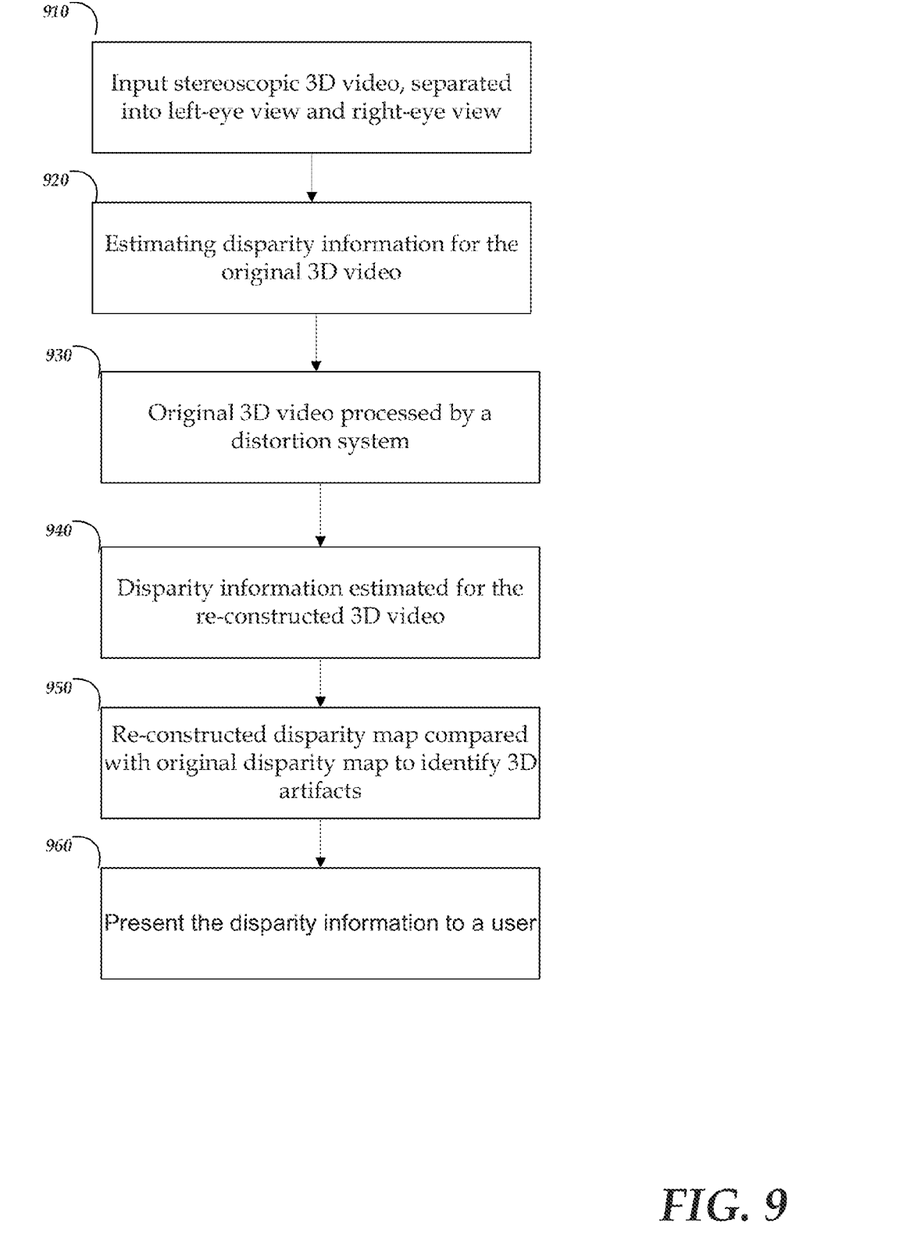
FIG. 9 is a flow chart illustrating embodiments of the present disclosure.

FIG. 9 is a flow chart illustrating embodiments of the present disclosure. Method 900 may begin at step 910 where stereoscopic 3D video, separated into left-eye view and right-eye view, may be input into the system.

Next, at step 920, disparity information for the original 3D video may be estimated. For example, a stereo matching algorithm may be employed to derive the disparity of two views. The algorithm may result in a 2D disparity map of the 3D video where the intensity of the map corresponds to disparity or "perceived depth". This map may be referred to as the original disparity map. In some embodiments, the disparity information for the original 3D video may be obtained in non-real time and provided as a parameter to the system.

Method 900 may next advance to step 930. At step 930 the original 3D video may be processed by a distortion system (which may include compression, filtering, scaling, etc.). The resulting distorted 3D video may be used to create a re-constructed version of the original 3D video.

Next, at step 940, disparity information may be estimated for the re-constructed 3D video. Again, a stereo matching algorithm may be employed to derive the disparity of two views. The algorithm may result in a 2D disparity map of the 3D video where the intensity of the map corresponds to disparity or "perceived depth". This map may be referred to as the re-constructed disparity map.

In some embodiments of the present disclosure, the disparity information is calculated by determining an overall distortion measure by performing a plurality of distortion measures that respectively correspond to different types of distortions. A weighted average may be obtained for the plurality of distortion measures to obtain an overall distortion measure.

Visual masking processes suggest that geometrical structure plays a role in the perceived fidelity of stereo 3D video. As such, embodiments employing a weighted distortion average may add a measure of geometrical structure fidelity. Thus, one of the plural measures corresponds to a geometrical distortion (or error). This geometrical distortion may be a measure of the accuracy of geometrical object outlines between the original picture (source) and the reconstructed picture via location error (displacements and via the strength of the gradient (across the outlines) throughout outlined objects. This process may include penalizing missing portions of the geometrical outlines (undetected borders).

The human visual system performs visual masking that effectively compensates for one view's inferior quality (in relation to the quality of its corresponding picture of the stereo pair). As such, in some embodiments, a higher weight may be given to the measure of geometrical distortion for the view exhibiting higher quality in each stereo pair. In further embodiments, the geometrical distortion is measured at the full resolution of the "coded picture" exhibiting the higher fidelity, and at a lower resolution for the second of the two in the stereo pair (the one with lower fidelity).

Method 900 may then proceed to step 950. At step 950, the re-constructed disparity map may be compared with original disparity map to identify 3D artifacts. 3D artifacts can be identified by calculating an error between the original disparity map and the re-constructed disparity map (e.g., a delta-disparity map). In some embodiments, 3D artifacts may be identified by comparing the gradient with respect to the time domain of the delta-disparity map.

Method 900 may proceed to step 960 where the 3D distortion measurement system presents the disparity information to a user. In some embodiments, the information may be presented side-by-side. For example, the 3D presentation may be viewed next to re-constructed disparity map and/or the delta-disparity map. In other embodiments, an overlay presentation may be made where the delta-disparity map may be superimposed on top of the 3D re-constructed video and viewed on a 3D TV. In yet other embodiments, statistical information based on the delta-disparity map may be displayed to characterize the 3D distortion. Furthermore, in other embodiments, the errors between original disparity map and reconstructed disparity map may be fed back into the encoder compression process to assist in improving encoder compression (influencing rate control decisions, QP assignments, mode decisions) to reduce 3D distortions.

An embodiment consistent with this disclosure may comprise a system for providing a customized interface depth. The system may comprise a memory storage and a processing unit coupled to the memory storage. The processing unit may be operative to display a content stream comprising a plurality of video planes, receive a request to display a program guide, and, in response to receiving the request, modify the display depth of the first video plane relative to at least one second video plane of the plurality of video planes, wherein the first video plane is associated with a scaled three-dimensional television signal and the second video plane is associated with program guide information. The request may be received, for example, from a remote control device. The display depth of the video planes may be modified by a pre-determined offset value.

Figure 10:
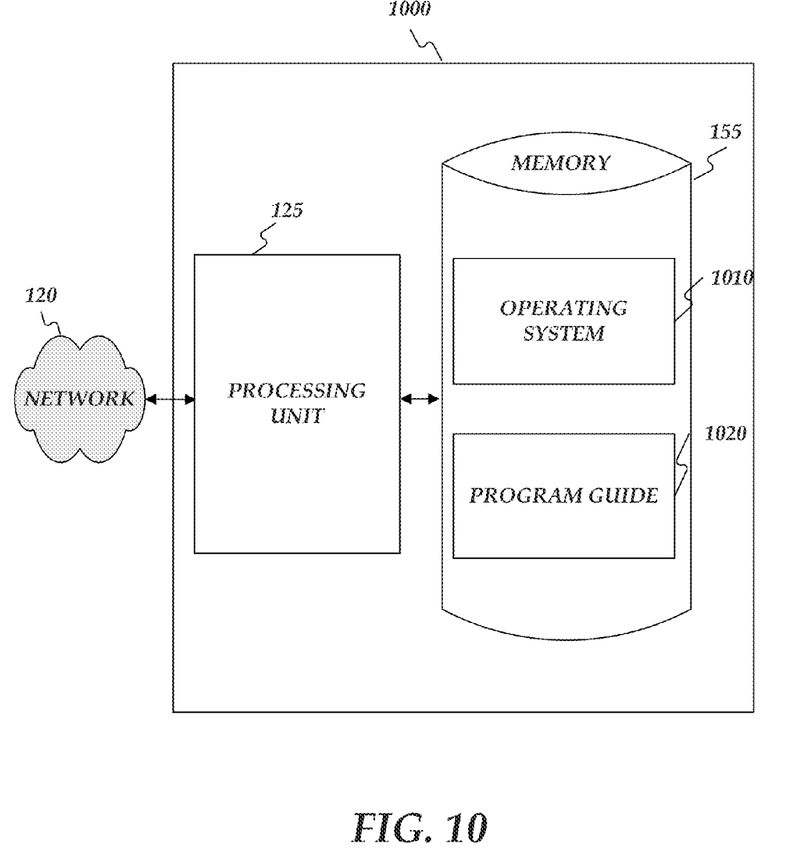
FIG. 10 is a block diagram of a computing device.

FIG. 10 illustrates a computing device 1000. Computing device 1000 may include processing unit 1025 and memory 1055. Memory 1055 may include software configured to execute application modules such as an operating system 1010 and/or a program guide interface 1020. Computing device 1000 may execute, for example, one or more stages included in the methods as described above. Moreover, any one or more of the stages included in the above describe methods may be performed on any element shown in FIG. 10.

Computing device 1000 may be implemented using a personal computer, a network computer, a mainframe, a computing appliance, or other similar microcomputer-based workstation. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a wireless fidelity (Wi-Fi) access point, or a facsimile machine. The aforementioned systems and devices are examples and the processor may comprise other systems or devices.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

What is claimed is:

1. A method comprising:
   receiving a source 3D video stream;
   receiving or generating disparity information associated with the source 3D video stream;
   receiving a distorted version of the same source 3D video stream;

generating disparity information associated with the distorted 3D video stream by employing a stereo matching algorithm to derive a disparity between a left view and a right view of the source 3D video stream;

comparing the disparity information associated with the source 3D video stream with the disparity information associated with the distorted 3D video stream; and altering an encoding process based on the results of comparing the disparity information associated with the source 3D video stream with the disparity information associated with the reconstructed and distorted 3D video stream.

2. The method of claim 1, wherein the source 3D video stream is one of: a frame-compatible 3D video and a multiple-view 3D video stream.

3. The method of claim 1, wherein the intensity of the disparity map corresponds to a perceived depth.

4. The method of claim 1, further comprising determining a gradient with respect to a time domain of a disparity map.

5. An apparatus comprising:
a memory; and
a processor coupled to the memory, wherein the processor is operative to:
create a first disparity map comparing a left image and a right image for a first 3D video stream;
create a second disparity map comparing a left image and a right image for a second 3D video stream, wherein the second 3D video stream comprises the first 3D video stream after being encoded and subsequently decoded, wherein the first disparity map and the second disparity map contain depth information indicative of picture degradation;
determine one or more error values between the first disparity map and the second disparity map;
identify 3D artifacts based on the one or more error values, wherein identifying 3D artifacts comprises comparing the fidelity of the first disparity map and the second disparity map; and
re-encode the first 3D video stream based on the identified 3D artifacts.

6. The apparatus of claim 5, wherein the processor is further configured to:
ignore disparities identified at a depth in the 3D video stream beyond a predetermined parameter.

7. A method comprising:
inputting a stereoscopic 3D video stream;
estimating disparity information for the stereoscopic 3D video stream;
processing the stereoscopic 3D video stream;
reconstructing the processed stereoscopic 3D video stream;
estimating disparity information for the reconstructed stereoscopic 3D video stream;
comparing the disparity information for the stereoscopic 3D video stream and the disparity information for the reconstructed stereoscopic 3D video stream; and
re-encoding the stereoscopic 3D video stream based on the disparity information.

8. The method of claim 7, wherein estimating disparity information comprises comparing a left-eye image and a right-eye image associated with the stereoscopic 3D video stream.

9. The method of claim 8, further comprising presenting a quality measurement derived from comparing the disparity information for the stereoscopic 3D video stream and the disparity information for the reconstructed stereoscopic 3D video stream.

10. The method of claim 9, wherein the quality measurement is displayed by one of:
side-by-side display of disparity information and 3D video stream and an overlay display of disparity information on the 3D video stream.

11. The method of claim 7, wherein comparing the disparity information for the stereoscopic 3D video stream and the disparity information for the reconstructed stereoscopic 3D video stream comprises:
performing a plurality of distortion measurements, wherein at least one distortion measurement comprises detecting displacement through location errors or determining a gradient strength.

12. The method of claim 11, further comprising calculating a weighted average across the plurality of distortion measurements.

13. The method of claim 12, further comprising penalizing undetected geometrical outline borders.

* * * * *